(12) United States Patent
Sar Shalom et al.

(10) Patent No.: US 11,727,058 B2
(45) Date of Patent: Aug. 15, 2023

(54) UNSUPERVISED AUTOMATIC TAXONOMY GRAPH CONSTRUCTION USING SEARCH QUERIES

(71) Applicant: Intuit Inc., Mountain View, CA (US)

(72) Inventors: Oren Sar Shalom, Nes Ziona (IL); Alexander Zhicharevich, Hod Hasharon (IL); Rami Cohen, Ashkelon (IL); Yonatan Ben-Simhon, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 549 days.

(21) Appl. No.: 16/573,619

(22) Filed: Sep. 17, 2019

(65) Prior Publication Data
US 2021/0081454 A1    Mar. 18, 2021

(51) Int. Cl.
*G06F 16/901* (2019.01)
*G06F 16/953* (2019.01)

(52) U.S. Cl.
CPC ........ *G06F 16/9024* (2019.01); *G06F 16/953* (2019.01)

(58) Field of Classification Search
CPC .......................... G06F 16/9024; G06F 16/953
USPC ....................................................... 707/706
See application file for complete search history.

(56) References Cited

U.S. PATENT DOCUMENTS

| | | | | |
|---|---|---|---|---|
| 10,289,637 B2 * | 5/2019 | Maghoul | ............. | G06F 16/951 |
| 10,776,965 B2 * | 9/2020 | Stetson | ............. | G06F 40/137 |
| 11,194,815 B1 * | 12/2021 | Kumar | ............. | G06F 16/24532 |
| 2007/0192306 A1 * | 8/2007 | Papakonstantinou | ........ | G06F 16/951 707/999.005 |
| 2009/0012842 A1 * | 1/2009 | Srinivasan | .......... | G06F 16/3344 707/999.005 |
| 2015/0220492 A1 * | 8/2015 | Simeonov | ............. | G06F 16/972 715/244 |
| 2017/0139991 A1 * | 5/2017 | Teletia | ............. | G06F 16/9024 |
| 2017/0199905 A1 * | 7/2017 | Ott | ............. | G06F 16/9024 |
| 2017/0199927 A1 * | 7/2017 | Moore | ............. | H04W 4/02 |

(Continued)

OTHER PUBLICATIONS

Fernandez-Fernandez, Miguel et al., "Automatic Taxonomy Extraction from Query Logs with No Additional Sources of Information"; Cornell University: <https:arxiv.org/abs/1510.00618v2>; Version v2 submitted Oct. 5, 2015 (21 pages).

(Continued)

*Primary Examiner* — Mark E Hershley
(74) *Attorney, Agent, or Firm* — Ferguson Braswell Fraser Kubasta PC

(57) ABSTRACT

A method involves receiving search queries, having search terms, submitted to at least one computerized search engine. For each query, a corresponding pairwise relation in the search queries is calculated. The corresponding pairwise relation is a corresponding probability of a potential edge relationship between at least two terms. Thus, potential edges are formed. A general graph of the terms is constructed by selecting edges from the potential edges. The general graph is nodes representing the terms used in the search queries. The general graph also is edges representing semantic relationships among the nodes. A hierarchical graph is constructed from the general graph by altering at least one of the edges among the nodes in the general graph to form the hierarchical graph.

20 Claims, 8 Drawing Sheets

(56) References Cited

U.S. PATENT DOCUMENTS

| | | | | |
|---|---|---|---|---|
| 2017/0221240 A1* | 8/2017 | Stetson | ................. | G06T 11/206 |
| 2017/0371926 A1* | 12/2017 | Shiran | ............... | G06F 16/24524 |
| 2018/0081943 A1* | 3/2018 | Johnson | ............. | G06F 16/2477 |
| 2018/0103052 A1* | 4/2018 | Choudhury | ............. | H04L 63/20 |
| 2018/0121546 A1* | 5/2018 | Dingwall | ................ | H04L 63/10 |
| 2019/0384843 A1* | 12/2019 | White | ................ | G06F 16/9024 |

OTHER PUBLICATIONS

Liu, Xueqing et al., "Automatic Taxonomy Construction from Keywords"; KDD '12 Proceedings of the 18th ACM SIGKDD international conference on Knowledge discovery and date mining; Beijing, China; Aug. 12-16, 2012 (9 pages).

\* cited by examiner

| Query A (Are Dogs Animals?) 300 | Query B (Is an Animal Alive?) 302 | Query C (Is a Computer Alive?) 304 | Query D (What Kind of Animal is a Dachshund)? 306 |

| Returned Results A 308 | Returned Results B 310 | Returned Results C 312 | Returned Results D 314 |

(Search Before Search Engine Optimization)

(Search After Search Engine Optimization)

UNSUPERVISED AUTOMATIC TAXONOMY GRAPH CONSTRUCTION USING SEARCH QUERIES

BACKGROUND

Search engines are software tools commonly used to find information in a computing environment. A search engine operates by receiving a search query, which includes one or more terms. The search engine compares the one or more terms to one or more databases of information in order to find a result, which in turn is returned to the user of the search engine.

A ubiquitous problem with search engines is that they can return information that is not relevant to the user's actual intent for the search. For example, a user may input the term "tank" into a search engine and receive results related to heavy military combat vehicles, when instead the user wanted to see information related to containers for water and other liquids.

One way of addressing this technical problem is to use a taxonomy graph as a way of relating the received search terms to alternative search terms. Thus, for example, the taxonomy graph might relate the word "tank" to both water tanks and military vehicles, and then submit a revised result back to the user accordingly. The search engine might also return, together with the search result, one or more suggestions for the user to further refine his or her search.

However, another technical problem can arise when using taxonomy graphs with respect to multiple ontological domains or in rapidly changing ontological domains which the search engine accesses in order to return a result. In particular, the relational definitions between terms in a graph may change frequently, thereby rendering taxonomy graph less useful or even harmful to aiding a user's search. However, updating the taxonomy graph, or creating a new taxonomy graph, is historically a manual process, which may not be feasible in a dynamic environment, in a large domain, or in multiple domains.

SUMMARY

In general, in one aspect, one or more embodiments relate to a method. The method includes receiving a plurality of search queries submitted to at least one computerized search engine, the plurality of search queries comprising a plurality of terms. The method also includes calculating, for each query in the plurality of search queries, a corresponding pairwise relation in the plurality of search queries. The corresponding pairwise relation comprises a corresponding probability of a potential edge relationship between at least two terms of the plurality of terms, to form a plurality of potential edges. The method also includes constructing a general graph of the plurality of terms by selecting a plurality of edges from the plurality of potential edges. The general graph comprises a plurality of nodes representing the plurality of terms used in the plurality of search queries. The general graph further comprises a plurality of edges representing semantic relationships among the plurality of nodes. The method also includes constructing a hierarchical graph from the general graph by altering at least one of the plurality of edges among the plurality of nodes in the general graph to form the hierarchical graph.

One or more embodiments also relate to a system. The system includes a data repository storing a plurality of search queries comprising a plurality of terms. The data repository also stores pairwise relations comprising probabilities of potential edge relationships between at least two terms of the plurality of terms. The data repository also stores a plurality of potential edges derived from the pairwise relations. The data repository also stores a general graph of the plurality of terms. The general graph comprises a plurality of nodes representing the plurality of terms used in the plurality of search queries. The general graph further comprises a plurality of edges representing semantic relationships among the plurality of nodes. The data repository also stores a hierarchical graph comprising one of a directed acyclic graph and a tree graph. The system also includes a processor in communication with the data repository. The system also includes an edge generator, when executed by the processor, configured to calculate the pairwise relations and to establish the potential edge relationships between the plurality of terms from the plurality of search queries. The system also includes a graph generator, when executed by the processor, configured to construct the general graph of the plurality of terms from the potential edge relationships; and construct the hierarchical graph by altering at least one of the plurality of edges among the plurality of nodes in the general graph to form the hierarchical graph.

One or more embodiments also relate to another method. The method includes receiving a plurality of search queries submitted to at least one computerized search engine, the plurality of search queries comprising a plurality of terms. The method also includes pre-processing the plurality of search queries by performing data normalization by applying at least one of lemmatization, special character removal, and stop word removal to the plurality of search queries; and performing data de-duplication on the plurality of search queries. The method also includes calculating, for each query in the plurality of search queries, a corresponding pairwise relation in the plurality of search queries. The corresponding pairwise relation comprises a corresponding probability of a potential edge relationship between at least two terms of the plurality of terms, to form a plurality of potential edges. The method also includes discarding potential edges in the plurality of potential edges that fail to meet a threshold probability value. The method also includes constructing a general graph of the plurality of terms by selecting a plurality of edges from the plurality of potential edges. The general graph comprises a plurality of nodes representing the plurality of terms used in the plurality of search queries. The general graph further comprises a plurality of edges representing semantic relationships among the plurality of nodes. The method also includes constructing a hierarchical graph from the general graph by altering at least one of the plurality of edges among the plurality of nodes in the general graph to form the hierarchical graph. Constructing the hierarchical graph is also performed by connecting a plurality of roots in the general graph to a global root node. Constructing the hierarchical graph is also performed by pruning lowest weighted edges from the plurality of edges in the general graph. The method also includes performing search engine optimization using the hierarchical graph.

Other aspects of the invention will be apparent from the following description and the appended claims.

DETAILED DESCRIPTION

Figure 1:
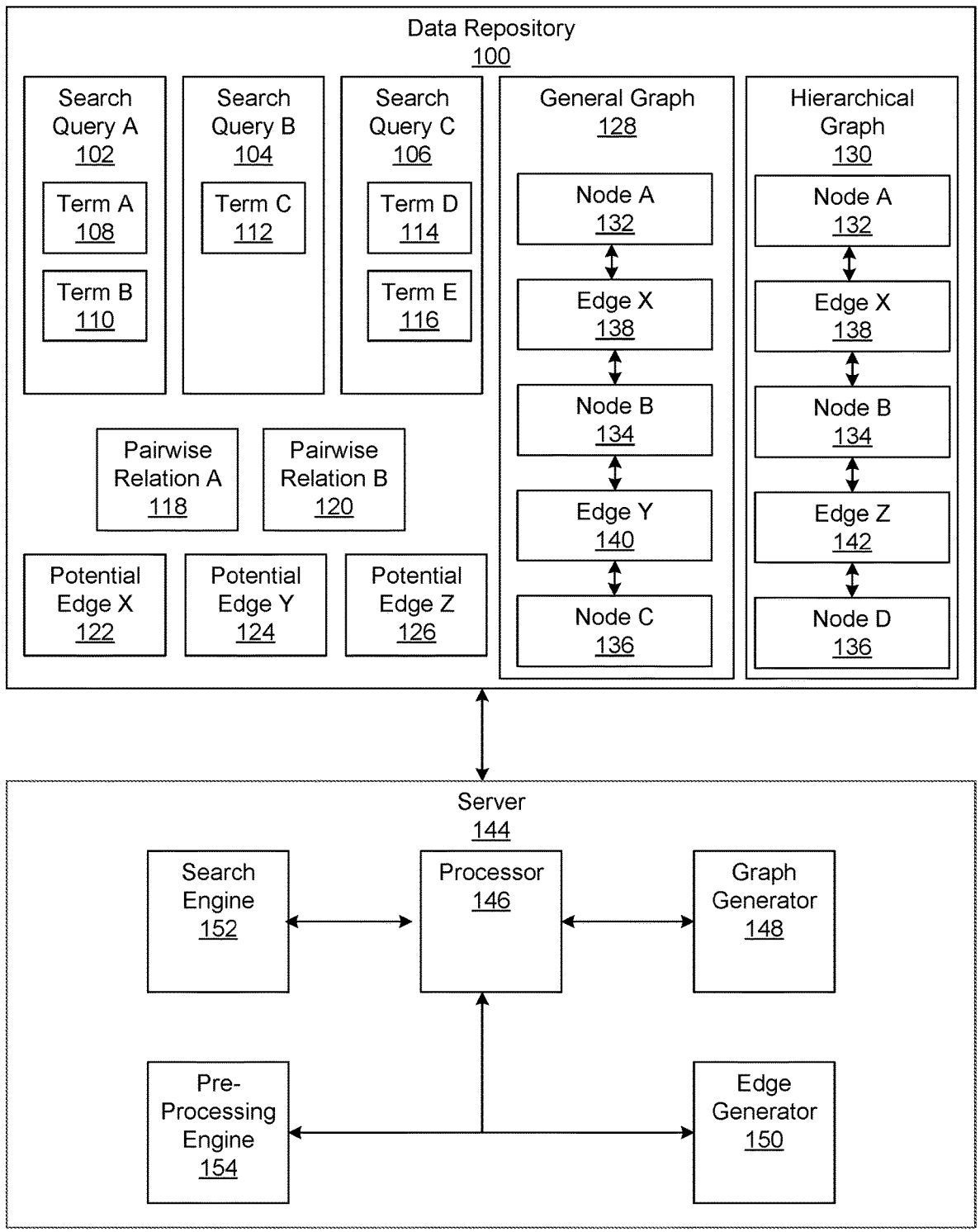
FIG. 1 depicts a schematic system diagram, in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to techniques for improving the quality and relevance of search results generated by a computerized search engine. In other words, embodiments of the invention relate to an improvement in computerized search engines so that a user entering a query will receive a result that is more relevant to the user's desired intention for a query. Embodiments of the invention improve the computerized search engine, in part, by performing unsupervised, automatic taxonomy hierarchical graph construction using past search queries and past returned results. In particular, embodiments of the invention relate to solving the technical problem of how to program a computer system to automatically generate, in an unsupervised manner, a taxonomy hierarchical graph which formally and quantitatively relates the ontology or meaning of terms relative to each other. The taxonomy hierarchical graph, also referred to herein simply as a "hierarchical graph" is useful for computerized search engines. Automatic, unsupervised construction of hierarchical graphs may be desirable in computing environments where a search engine accesses multiple domains, accesses relatively large domains, or accesses domains that are constantly changing over time. In the case of multiple domains or large domains, using the current technique of manually updating a domain may be impractical or undesirably expensive due to size or complexity of the domain or domains. In the case of domains that constantly change over time, otherwise known as dynamic domains, a hierarchical graph should also update frequently in order to retain optimal usefulness.

Like larger or multiple domains, using the current technique of manually updating a dynamic domain may be impractical or undesirably expensive due to the rate at which the hierarchical graph is to be updated. The technical problem is exacerbated in the case of multiple, relatively large, dynamic domains. Thus, the one or more embodiments provide a detailed technique for programming one or more computers to generate, automatically and in an unsupervised manner, a hierarchical graph representing one or more domains, some or all of which may be dynamic. In particular, in one or more embodiments, information is extracted from user behavior as expressed by search queries and how and/or when a user clicks on subsequently returned documents. In other words, the one or more embodiments take advantage of data provided by user searches and user behavior with respect to the returned results in order to automatically construct a hierarchical graph that relates the semantic meanings among terms used in the searches.

FIG. 1 depicts a schematic system diagram, in accordance with one or more embodiments. The system shown in FIG. 1 may be implemented as hardware, software, or a combination thereof.

The system shown in FIG. 1 includes a data repository (100) in accordance with one or more aspects of the invention. The data repository (100) stores a number of files and other information in accordance with one or more embodiments. In general, a data repository (100) is one or more storage units (e.g., database, file system, or other storage structure) and/or hardware or virtual device(s) (e.g., non-transitory computer readable storage medium, memory, cloud storage, storage server, etc.) for storing data. The data repository (100) may include multiple homogeneous or heterogeneous storage units or devices.

For example, the data repository includes a number of search queries, such as but not limited to Search Query A (102), Search Query B (104), and Search Query C (106). Any of the search queries may be past search queries, such as the search engine (152) described further below. More generally, a query is one or more terms that have been provided to a search engine. Search queries, and thus terms, may also include metadata related to search terms, such as but not limited to timestamps, user identifiers, session identifiers, dwell times (i.e., the time spent between when results were returned and when the user clicks on a result), and complete payloads (i.e., some or all of the results returned by the search engine).

In one or more embodiments, each search query may include one or more terms. Thus, for example, Search Query A (102) includes Term A (108) and Term B (110). In turn, Search Query B (104) includes Term C (112), and Search Query C (106) includes Term D (114) and Term E (116). Again, when taken together, a given set of terms may form a search query. Most generally, a term is any input which may be used by a search engine to perform a search. Thus, most generally, a term could be a computerized picture, a sound file, input from a user via a touchscreen, a string of alphanumerical characters, or any other type of computer-readable input. However, in many cases, a term is a string of alphanumeric characters. For many users, a search query is usually one or more human-readable words, about which a user desires to learn more information.

As an initial step to automatically generating a hierarchical graph for use with a search engine, such as hierarchical graph (120), a computer or software is programmed to create pairwise relations between the terms of the search queries described above. The process for creating the pairwise relations is described further with respect to FIG. 2A.

Continuing with FIG. 1, the pairwise relations are stored in the data repository (100). For example, the data repository may store Pairwise Relation A (118) and Pairwise Relation B (120). Each pairwise relation is a corresponding probability of a potential edge relationship between at least two terms in any of the search terms. Thus, a pairwise relation may be any of 1) a first term in a first query compared to a second term in a second query; 2) two terms in the same query compared to each other; and 3) a combination of 1) and 2) when creating multiple pairwise relations. The potential edge relationships are shown in FIG. 1 as Potential Edge X (122), Potential Edge Y (124), and Potential Edge Z (126). As used herein, a "potential edge relationship" is a candidate edge relationship between at least two nodes in a general graph (128) or a hierarchical graph (130), as explained further below.

Each pairwise relation may also be characterized as a calculated probability that a first query encodes a broader information need than a second query, and hence that the first query should be an ancestor of the second query in the hierarchy that is to be automatically constructed. Based on the calculated probabilities, several potential edge relationships exist between the terms used in different queries. Thus, Potential Edge X (122), Potential Edge Y (124), and Potential Edge Z (126) may be stored in the data repository as a result of calculating the pairwise relations. The process of calculating pairwise relations and potential edges is described further with respect to FIG. 2A.

In one or more embodiments, potential edges having a probability below a pre-determined threshold are discarded. The pre-determined threshold is a number. The pre-determined threshold may be determined empirically by observing the effectiveness of past hierarchical graphs generated with other pre-determined thresholds or may be set by a computer programmer user. In any case, what remains after discarding some potential edges is a set of nodes related by edges. The set may be referred to as a general graph (128).

Continuing with FIG. 1, in one or more embodiments, the general graph (128) is a type of hierarchical graph or semantic graph, which is initially formed from the pairwise relations and from the potential edges described above. The general graph (128) is a set of nodes and a set of edges between the nodes. A "node" is a term or a location within a graph. An "edge" is a defined relationship between two nodes. The defined relationship that constitutes an edge may be quantitatively defined or may be qualitatively defined. For example, the defined relationship of an edge might quantitatively specify a 0.98 probability of correspondence between two nodes, indicating the two nodes are very closely related when "1" indicates an identical correspondence. In another example, the defined relationship of an edge might be a qualitative designation of "a type of"; as in, a "dog" is "a type of" "animal." The process for forming the general graph (128) from the pairwise relations is described further with respect to FIG. 2A.

In one or more embodiments, the general graph (128) is a type of taxonomy graph that is to be transformed into are more useful type of taxonomy graph, such as hierarchical graph (130). Most generally, a taxonomy graph is a quantitatively defined data structure that sets forth the relationships between different terms. Any taxonomy graph includes at least two nodes, i.e., the terms, and one edge i.e., the relationship between the terms.

In the example of FIG. 1, general graph (128) is defined by three nodes, Node A (132), Node B (134), and Node C (136), which are connected via two edges, Edge X (138) and Edge Y (140). Thus, for example, Node A (132) is connected to Node B (134) via Edge X (138).

In a more particular example, Node A (132) could be the term "animal" and Node B (124) could be the term "cat", and Edge X (138) could be a definition of a class-sub-class relationship. In other words, a "cat" (Node B (134)) is a sub-class (Edge X (138)) of the more general class of "animal" (Node A (132)). Continuing this example, Node C (136) could be the term "Jake", the name of a specific cat. In this case, Edge Y (140) is a definition of "instantiation of"; i.e., "Jake" (Node C (136)) is an instantiation or a specific instance (Edge Y (140)) of the term "cat" (Node B (134)).

Figure 2A:
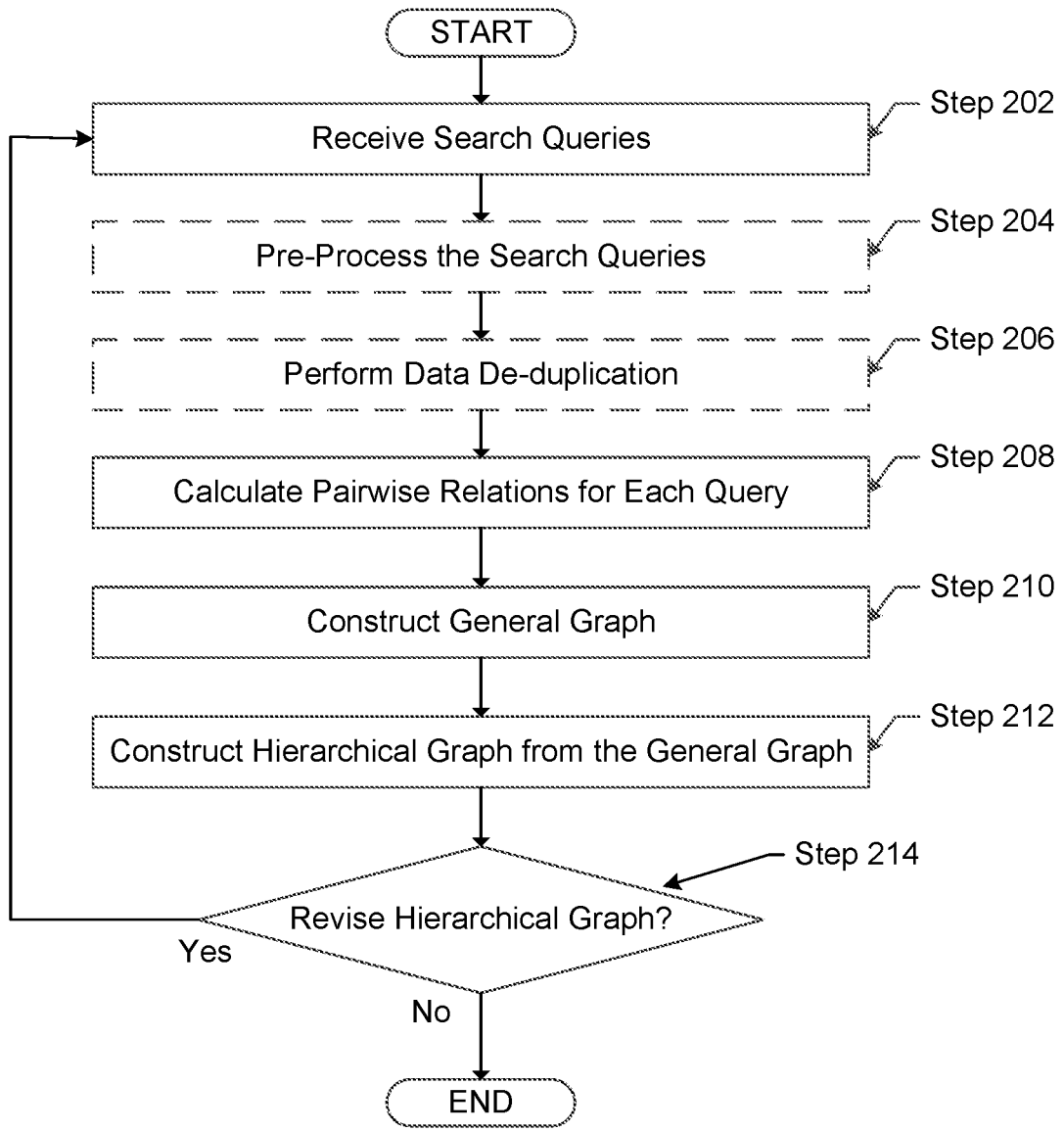
FIG. 2A and FIG. 2B depict flowchart diagrams, in accordance with one or more embodiments.
Figure 2B:
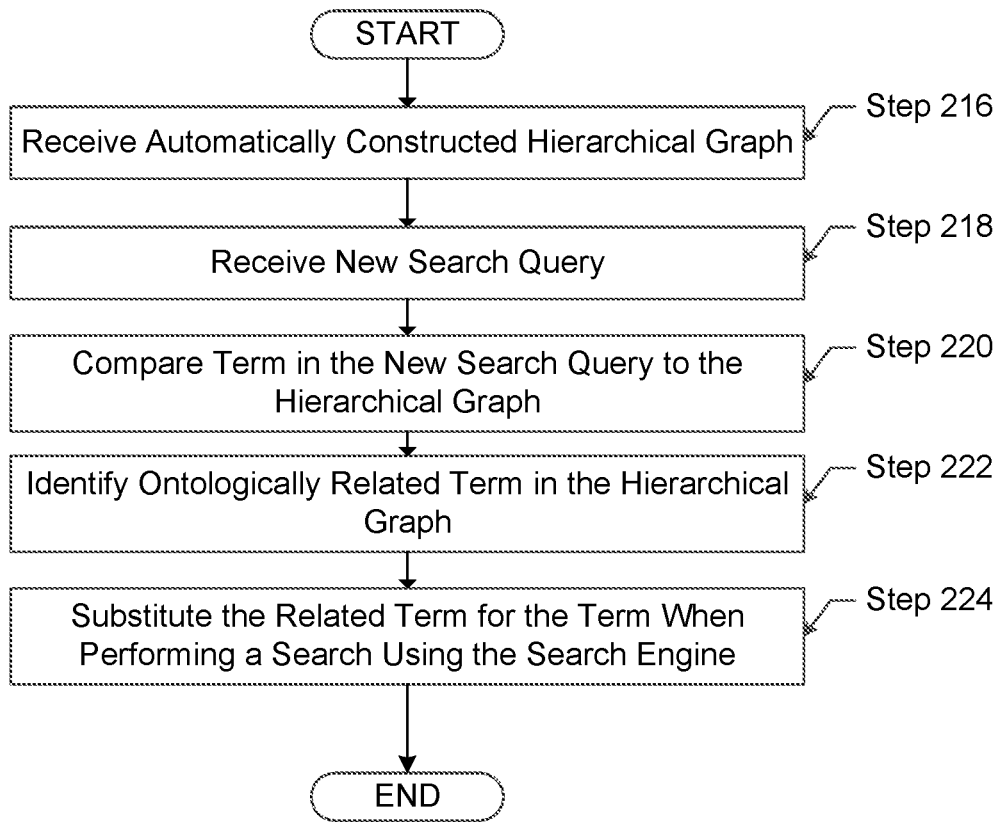

As indicated above, the general graph (128) may be not suitable or not optimal with respect to search engine optimization, such as the search engine optimization process shown in FIG. 2B. In one or more embodiments, the generation of the general graph (128) from the automatically determined pairwise relations among query search terms may create incomplete or imprecise relationships.

For example, a root node may not be present in the general graph (128). In one or more embodiments, a root node is a node that is a node to which many other nodes are connected, possibly through intervening nodes and edges. Additionally, edges between nodes in the general graph could be effectively duplicates of each other. Still further, a pair of terms might not be related to each other ontologically within a pre-determined probability of closeness, despite the culling of potential edges during automatic construction of the general graph (128). For example, the term "cat" (a node) could be paired with "dog" (another node) via an edge, though more properly "cat" and "dog" are both sub-classes of the more general class "animal." In some cases, pairwise relationships may be created that are simply incorrect; for example, the name "Jake," associated with a specific "cat," could have been incorrectly associated with a node "dog".

Thus, the general graph (128) should be adjusted in order to form the hierarchical graph (130) that will ultimately be utilized by the search engine during search engine optimization. The process of adjusting the general graph (128) to form the hierarchical graph (130) is described further with respect to FIG. 2A, below.

Because the hierarchical graph (130) is also a type of taxonomy graph, hierarchical graph (130) also is defined by a number of nodes and edges. In this example, hierarchical graph (130) includes the same nodes as general graph (128); i.e., Node A (132), Node B (134), and Node C (136). However, relative to the general graph (128), different nodes may also be present in the hierarchal graph, as well as more or fewer nodes, as a result of the process of modifying the general graph (128).

Like the general graph (128), the hierarchical graph (130) includes Edge X (138) connecting Node A (132) and Node B (134). However, the hierarchical graph (130) has been modified. In particular, Node B (134) is now connected to Node D (136) via a different edge: Edge Z (142). In other words, the ontological or semantic relationship between the two nodes has been changed when the general graph (128) was transformed into the hierarchical graph (130).

The above example is not limiting. In practical examples, many changes may be expected between the general graph (128) and the hierarchical graph (130). More or fewer nodes may be present. Some nodes may be connected to multiple other nodes as a result of the transformation. Edges between nodes may be added, deleted, or redefined. Again, this process is described further with respect to FIG. 2A.

Continuing with FIG. 1, the hierarchical graph (130) may be expressed as different kinds of semantic graphs. In particular, the general graph (128) may be transformed into a particular kind of hierarchical graph (130) as part of the transformation process. For example, the general graph (120) may be transformed into any of a directed acyclic graph ("DAG"), a tree graph, or a forest graph, all of which are embodiments of the hierarchical graph (130).

In one or more embodiments, a DAG is a directed graph that has a topological ordering, a sequence of vertices such that every edge is directed from earlier to later in the sequence. For example, a spreadsheet can be modeled as a DAG, with a vertex for each cell and an edge whenever the formula in one cell uses the value from another; a topological ordering of this DAG can be used to update all cell values when the spreadsheet is changed.

Figures 3, 4:
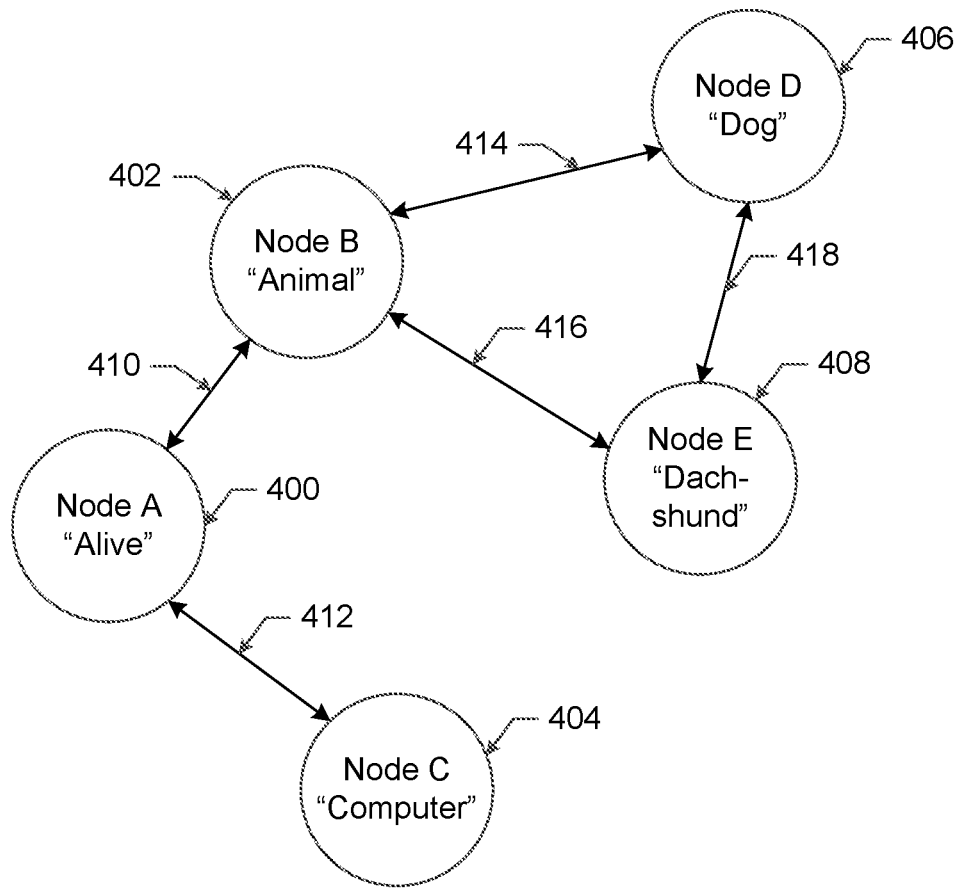
FIG. 3 depicts a group of past queries, in accordance with one or more embodiments.
FIG. 4, and FIG. 5 depict use case examples of hierarchical graphs automatically generated from the group of past queries in FIG. 3, in accordance with one or more embodiments.
Figure 5:
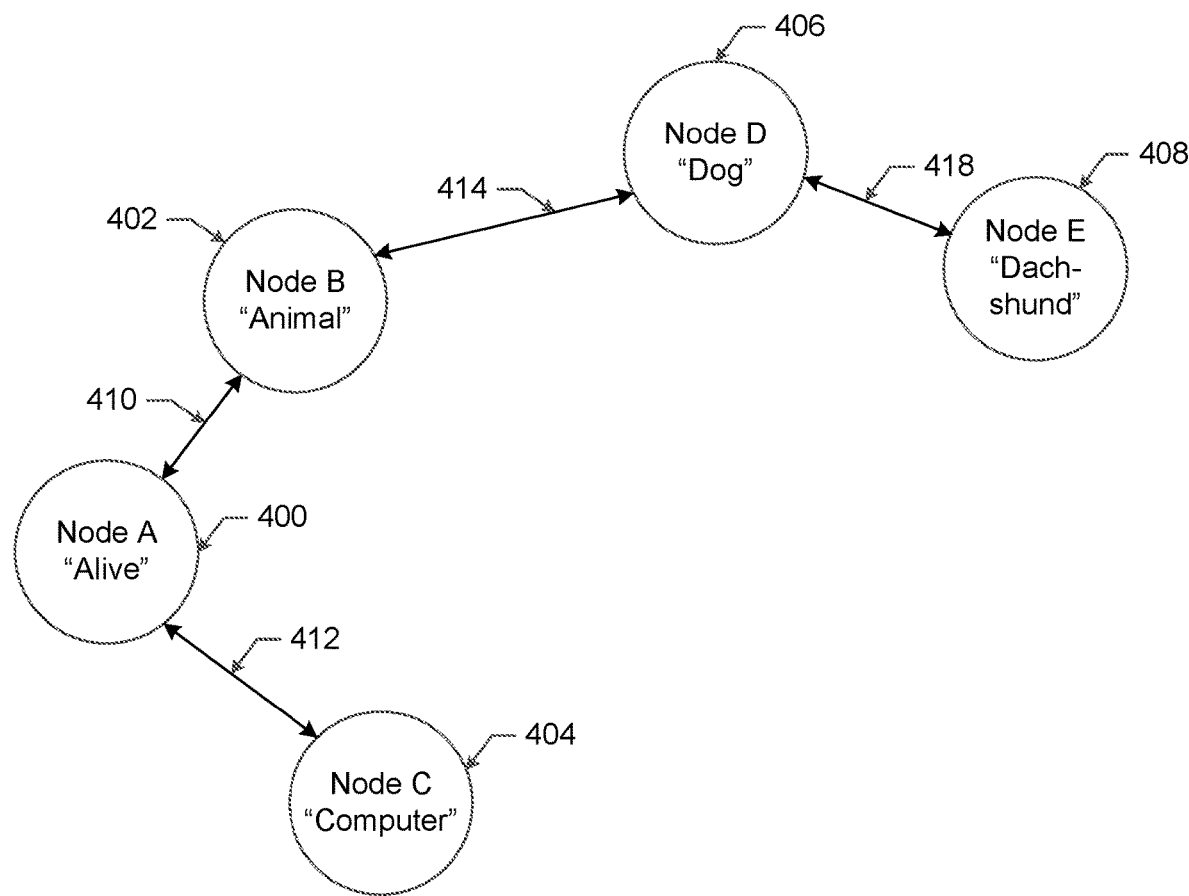

In one or more embodiments, a tree graph is an undirected graph in which any two vertices are connected by exactly one path. In other words, any acyclic connected graph is a tree. Examples of tree graphs are shown in FIG. 4 and FIG. 5. In one or more embodiments, a forest graph is a union of tree graphs, possibly a disjointed union of tree graphs.

Returning to FIG. 1, the data repository (100) may be in communication with one or more computers configured to receive, process, and output data to and from the data repository (100). For example, the data repository (100) may be in communication with a server (144). The server (144) is one or more computers, possibly in a distributed computing environment, such as the system shown in FIG. 8A, and connected via a network, such as the network (820) shown in FIG. 8B.

Continuing with FIG. 1, the server (144) includes a processor (146). The processor (146) is in communication with the data repository (100), possibly through an intervening bus or some other communication connection. The processor (146) is configured to execute one or more software programs useful in the automatic construction of the hierarchical graph (130).

Thus, the processor (146) may be in communication with a graph generator (148) and an edge generator (150). In one or more embodiments, the graph generator (148) is software and/or hardware programmed to calculate the pairwise relations and to establish the potential edge relations between the terms from the search queries. In one or more embodiments, the edge generator (150) is software and/or hardware programmed to construct the hierarchical graph by altering at least one of the edges among the nodes is the general graph (128) to form the hierarchical graph (130).

In one or more embodiments, the server (144) may also include a search engine (152). The search engine (152) is hardware and/or software executable by the processor (146). A search engine (152) itself uses a search query to find information related to the search terms in one or more computers or data sources, possibly across a distributed computing environment. The search engine (152) may be external to the server (144) in some embodiments. The search engine (152) may be configured to execute new search queries while using the hierarchical graph (130). In this manner, the hierarchical graph (130) allows for search engine optimization. Further information regarding the optimization of the search engine (152) is described with respect to FIG. 2B.

Continuing with FIG. 1, the server (144) may also include a pre-processing engine (154). The pre-processing engine (154) is hardware and/or software executable by the processor (146). In one or more embodiments, the pre-processing engine (154) is configured to calculate to perform data de-duplication, and other data manipulation on the plurality of search queries prior to calculation of the pairwise relations, potential edges, and the general graph (128). The pre-processing engine (154) may perform other functions, as described further with respect to FIG. 2A.

FIG. 2A depicts a flowchart diagram, in accordance with one or more embodiments. The method shown in FIG. 2A may be performed using the system shown in FIG. 1. The method shown in FIG. 2A may also be performed using the system and network shown in FIG. 8A and FIG. 8B. The steps shown in FIG. 2A are performed by a computer, and may be specifically performed by a server, such as server (144) shown in FIG. 1.

At step 202, search queries are received in accordance with one or more embodiments of the invention. The search queries may be received from a data repository, such as data repository (100) of FIG. 1. In one or more embodiments, the search queries are generated by users submitting past search queries into a search engine. The past search queries may have been previously stored in the data repository for retrieval at step 202 or may be retrieved at step 202 as the queries are submitted in real time.

At step 204, data pre-processing may be performed on the search queries in accordance with one or more embodiments. Step 204 is an optional step, and thus is shown using broken lines in FIG. 2A. In one or more embodiments, pre-processing changes the data into a form that is more favorable or easier to process for an intended application. For example, in order to extract the core information desired from each query, a normalization may be performed on the terms extracted from the queries. Normalization may involve lemmatization, special character removal, stop word removal, neglecting or ignoring word order when processing terms, removing pre-defined terms, adding pre-defined terms, or any other desirable pre-processing.

In one or more embodiments, Lemmatization is the process of grouping together different inflected forms of a word so the different word forms can be analyzed as a single item. In computational linguistics, lemmatization is the algorithmic process of determining the lemma for a given word.

Special character removal is the process of removing characters such as, but not limited to, "*", "#", "!", and others. However, any kind of character could be pre-defined to be a "special character."

Stop words removal is the process of deleting natural language terms prior to further data processing. Stop words usually refer to the most common words in a language (e.g., "a", "an", and "the"). However, any words may be pre-defined as "stop" words in a particular embodiment.

At step 206, data de-duplication may be performed in accordance with one or more embodiments of the invention. Step 204 is an optional step, and thus is shown using broken lines in FIG. 2A. Data de-duplication may be desirable because the same information type can be expressed in different wording in two different queries. The purpose of data de-duplication is to combine similar query terms together.

Continuing with FIG. 2A, two queries encode the same information type if a combination of their collaborative similarity and lexical similarity exceeds some pre-defined threshold. Collaborative similarity between a pair of queries is a quantitative assessment the similarity of their associated clicked documents. For example, if two different queries produced substantially the same query results, then the two queries, and hence their terms, are collaboratively similar. Identifying the collaborative similarity among different queries allows the creation of clusters of queries that have a pre-determined quantitative similarity to each other, including possibly identical queries. Determining lexical similarity between pairs of search queries is performed by determining whether terms in the pairs of search queries are ontologically similar to each other within a quantifiable distance on a general graph or a hierarchical graph.

The term "distance" refers to a measurement of length between nodes on a graph, as defined by the axes of the graph. For example, a simple hierarchical graph may have two axes, vertical and horizontal, with each axis segmented into segments defined as being length "1" each. Thus, two nodes on such a graph may be connected by a line which has a distance of "4.3" as measured relative to the two axes. Note that the units of measurement may or may not be relevant to this determination. Of importance is the fact that a distance may be calculated and compared to a threshold number set by the computer programmer to set which nodes (terms) are ontologically similar to each other.

Based on a combination of the collaborative similarity and lexical similarity, semantically identical queries can be identified among any given pair of queries in accordance with one or more embodiments of the invention. A pair of queries is semantically identical if the combination of the collaborative similarity and lexical similarity (such as their numerical average or weighted average) exceeds some pre-determined threshold. Any queries that are determined to be semantically identical may be removed.

At step 208, a pairwise relation is calculated for each query in the queries received at step 202 in accordance with one or more embodiments. Step 208 is one example of a technical means for automatically identifying, in new domains, the hierarchical nature of extracted terms in the search queries, without human labeling or intervention. Thus, step 208 relates to how to program a computer to generate a general graph, such as general graph (120) of FIG. 1.

The one or more embodiments contemplate that any query encodes some information type. The information type can be mapped into a node in an induced taxonomy. As an example, a user may seek information regarding a specific object or task, and expresses the information in a query (e.g., how to change a password). A certain information type may be broader of another (e.g., a query related password settings versus a query related to resetting a password). The following paragraphs describe, specifically, how a computer can be programmed to induct a hierarchical relationship among terms extracted from the queries.

In summary, pairwise relations may be calculated by calculating the probability that a given query encodes a broader information type than another query, and hence should be an ancestor in the constructed hierarchy. The term "information type" refers to a category of information into which input information may be sorted. Broader information types are related as edges to narrower information types. Edges having a probability that exceeds some threshold are retained, the remaining edges are discarded.

For example, the word "dog" is a broader information type than the word "dachshund." The information type of "dog" is "intermediate category" and the information type of "dachshund" is "intermediate category instance." Thus, the broader information type of "dog" is related as an edge to a narrower information type of "dachshund." A query might be "what kind of animal is a dachshund?" In the one or more embodiments, a pairwise relation is calculated by calculating a probability that this query encodes a broader information type than another query, and hence should be an ancestor in the constructed hierarchy. In this instance, the word "animal" leads to a probability that the query encodes a broader information type than another query, "is a dachshund a dog?", because the word "animal" is a broader information type than the word "dog" and the word "dachshund." Thus, from the two queries, an additional node is established as "animal", and edges established between "animal" and "dog" and between "dog" and "dachshund." In this case, the probabilities of these two edge relationships exceeds a threshold, and thus the edges are retained.

Attention is now turned to the details of calculation of pairwise relations between search query terms or search queries in accordance with one or more embodiments of the invention. First, definitions of terms are provided.

Let "A" be a first query, A, and let "B" be a second query, B. The expression A>B denotes the event where a first information type that is expressed in query A is the ancestor of a second information type that is expressed in query B.

Let "Q" represent clicks on documents that were returned in response to query B. Q_B represents the distribution of clicks on documents returned as a result of performing query B.

Let "d" represent a document returned as a result of any query. In this case, "d \in I_A" represents the event where document d is relevant to the information, I, desired of query A. Thus, I_A is an information need (i.e., what kind of animal is a dachshund?)

Let "n" be a number. In this case, n_A represents the number of clicks on documents returned as a result of query A. Additionally, n^d_A represents the number of clicks on document, d, returned as a result of performing query A.

Let "K" represent unique documents. In this case, K_A represents the number of unique documents, d, that were clicked when returned as a result of performing query A.

Let "P" represent a probability. Here, "P(A>B)" is the probability that query A encodes a broader information type than query B. In this case, P(A>B):=E_{d\sim Q_B}[P(d \in I_A)]. (Equation 1). In equation 1, "A" is a first query to a search engine;
"B" is a second query to the search engine;
"A>B" denotes an event where an information need that is expressed in a first query, query "A", is an ancestor of a second query, query "B";
"E" is the expected value of {d\sim Q_B}[P(d\in I_A)] (in other words, P(A>B)=E).
"d" is a document retrieved as a result of the first query;
"Q_B" is a distribution of clicks on documents upon entering a query "B" to the search engine; and "d \in I_A" as an event of the document "d" retrieved by the search engine being relevant to an information need of the query "A".

Another way to write equation 1 is $P(A>B)=\Sigma_d P(d|Q_B) \cdot P(d \in I\_A)$.

In equation 1, the distribution of the document is given by Q_B. In order to compute P(d \in LA), first the null hypothesis H_0 is defined as the claim that clicks on d happened randomly, regardless of the information need of A.

Continuing this procedure, let "K_A" represent the size of the union of all payloads presented as a result of performing query A. A payload is the set of links, documents, and other information returned as a result of performing a query.

In this case, P(H_0) is the probability of clicking at most n^d_A times at random. P(H_0) can be approximated by \Phi(n^d_A; \mu, \sigma^2), where: \Phi is the cumulative distribution function ("CDF") of normal distribution, \mu=n_A/K_A, \sigma^2=\mu(1-1/K_A).

If dwell time is given, then p(d \in I_A) can be refined by assuming that a short dwell time means that the document is not relevant to the information need. The term "short" is a time below a pre-determined threshold value as designated by a computer programmer.

Likewise, given a user session of entering more than one query into a search engine, a better understanding of the relevance of each document to the query can be evaluated in accordance with one or more embodiments of the invention. If a user continued to a document B after reading document A (either from a same search or after performing multiple searches), then probably document A did not fulfill the information need of the user. This fact affects the semantic meaning of the terms in the query or queries, and thus affects the pairwise relations between terms in the query or queries. The relevance can be expressed as a weighting factor applied to the probability that two terms or two queries are related to each other.

The probability that a query A encodes a broader information type than query A, P(A>B) and the probability of clicking a document randomly, P(H_0), establish a corresponding pairwise relation in a group of multiple search queries. Each corresponding pairwise relation is a corresponding probability of a potential edge relationship between at least two terms in the terms, thereby establishing at least one, if not multiple edges between query search terms.

Returning to FIG. 2A, at step 210 a general graph is constructed in accordance with one or more embodiments of the invention. In particular, the general graph is constructed by selecting one or more edges from the group of potential edges. The edges may be selected based on a probability that a given edge correctly relates two nodes (i.e., query terms). For example, the probabilities expressed above (P(A>B) and P(H_0)), or a combination thereof, may be the probability that a given edge correctly relates two nodes. Edges above a certain probability value are retained as selected edges, and the remaining edges are discarded. The selected edges then form the relationships between terms from the queries (i.e., the edges), with the terms being nodes in the general graph. Thus, the general graph can be described as a set of two or more nodes representing the terms used in the search queries, connected by one or more edges representing semantic relationships among the nodes.

At step 212, a hierarchical graph is constructed from the general graph in accordance with one or more embodiments of the invention. Most generally, the hierarchical graph is constructed by altering at least one edge among the two or more nodes in the general graph. Altering an edge could include removing an edge, deleting an edge, or redefining an edge relationship between two nodes. Altering an edge may be performed based on pre-defined rules, such as to require that at least one root node be present in the hierarchical graph, or to remove edges below a semantic threshold value. One or more edges may also be altered by pruning edges to form a directed acyclic graph (DAG) or a tree graph. In a specific example, the hierarchal graph can be constructed by greedily pruning lowest weighted edges to form a valid DAG or tree, and then to connect the roots of the connectivity components to a global root node.

Thus, stating steps 210 and 212 differently, at step 210 the general graph is constructed first as a "rough" version. However, the rough version (the general graph) is likely not as accurate as desired by the software engineer. Thus, at step 212, the general graph is improved (such as by greedy pruning) in order to arrive at the hierarchical graph. The hierarchical graph is the graph that is desired in this case.

The hierarchical graph can be continuously updated in accordance with one or more embodiments. Thus, for example, at step 214, a determination is made whether to revise the hierarchical graph. If "yes" at step 214, then the method returns to step 202 and repeats starting with receiving new or modified queries in accordance with one or more embodiments. Note that the entire process is repeated, which effectively creates a new general graph and subsequently a new hierarchical graph. However, in an embodiment, some of the pre-processing performed at steps 204 and 206 may be retained in order to increase the efficiency of the revision process, with pre-processing only applying to new search queries received. In any case, if "no" at step 214, then the method terminates.

Note that the hierarchical graph constructed using the method of FIG. 2A may be entirely automatic in accordance with one or more embodiments. Thus, for example, both the general graph and the resulting hierarchical graph are constructed without user-defined labels for a target domain. In other words, the hierarchical graph is automatically constructed from a database of user search queries without human intervention. Similarly, any resulting search engine optimization (see FIG. 2B) can be performed automatically without user intervention.

FIG. 2B depicts a flowchart diagram, in accordance with one or more embodiments. The method shown in FIG. 2B. may be characterized as a method of performing search engine optimization (SEO). The method shown in FIG. 2B may be performed using the system shown in FIG. 1. The method shown in FIG. 2B may also be performed using the system and network shown in FIG. 8A and FIG. 8B. The method shown in FIG. 2B may be specifically performed with respect to a single server, such as server (144) shown in FIG. 1. In accordance with one or more embodiments, the method shown in FIG. 2B may be performed after a hierarchical graph is formed at step 212 of FIG. 2A.

At step 216, the hierarchical graph automatically constructed at step 212 is received at the server. At step 218, a new search query, that had been input into a search engine, is received at the server.

At step 220, a term in the new search query is compared to the hierarchical graph in accordance with one or more embodiments. As used herein, the comparison may be finding the identical term in the hierarchical graph. The comparison may also be finding a different term in the graph defined to be semantically identical to the term (i.e., the term and the related term are semantically identical to each other within a quantified degree). For example, the term "dogs" might match the term "dog", even though they are not exactly the same term.

At step 222, an ontologically related term is identified in the hierarchical graph in accordance with one or more embodiments. As used herein the identification of the ontologically related term may be performed by finding an edge between the term in the new search query (or the equivalent term in the hierarchical graph) and another node in the hierarchical graph. For example, the term "dog" may be a node in the hierarchical graph connected to another node, "canine", via an edge which defines the ontological relationship between the terms "dog" and "canine". Depending on the information domain being searched, the term "canine" may be a better word for identifying relevant articles in the information domain than the term 'dog."

At step 224, the related term may be substituted for, or added to, the term used in the new search query in accordance with one or more embodiments. Thus, the search engine executes the search using the related term, in favor of or in addition to the term in the new search query entered by the user. For example, the search engine searches the information domain using the term "canine" instead of using the term "dog." In other embodiments, the search engine may return multiple sets of results based on both original terms and identified related terms. For example, the search engine may return one set of results using the term "canine" in the search engine and also return another set of results using the word "dog" in the search engine. In one or more embodiments, the method of FIG. 2B may terminate thereafter.

FIG. 3 depicts a group of past queries, in accordance with one or more embodiments. FIG. 4 and FIG. 5 depict use case examples of hierarchical graphs automatically generated from the group of past queries in FIG. 3, in accordance with one or more embodiments. FIG. 3 through FIG. 5 should be read together as part of an integrated example of the devices and methods described with respect to FIG. 1, FIG. 2A, and FIG. 2B.

Each of Query A (300), Query B (302), Query C (304), and Query D (306) are past queries which users entered into a search engine while looking for information. Each of the queries could be any of the search queries stored in data repository (100) shown in FIG. 1. In this specific example, Query A (300) is "are dogs animals." Query B (302) is "is an animal alive." Query C is "is a computer alive?" Query D is "what kind of animal is a dachshund."

Each query is associated with a corresponding result returned as a result of entering the query, together with any associated metadata (such as user identification, time stamp, etc.) in accordance with embodiments of the invention. Thus, Query A (300) is associated with Returned Results A (308); Query B (302) is associated with Returned Results B (310); Query C (304) is associated with Returned Results C (312); Query D (306) is associated with Returned Results D (314). These returned results are used for constructing the general graph shown in FIG. 4, as explained further below. Briefly, steps 200 through 208 of FIG. 2A are performed on these query results to produce the general graph shown in FIG. 4.

Thus, for example, Returned Results "D" might return articles or documents with information relating to the dachshund breed of dog. Information about the user's behavior with the returned results might also be stored. For example, the user might wait for a "long" time before clicking on an article, otherwise known as a long dwell time. The term "long" is a pre-determined value of time, typically about several seconds. A long dwell time is indicative that the returned results did not return information that the user immediately considered to be relevant to the real intent of the user's query. For example, the user may not have been interested in learning the properties of the dachshund dog breed, but rather was more interested in learning the taxonomy classification structure of a dachshund relative to dogs generally. However, the user, not being an expert in evolutionary biology, may not have thought to use words such as "taxonomy classification" in the search. As a result, the user becomes frustrated when documents not relevant to the user's search intent are returned.

For this reason, search engine optimization is desirable to improve the user's experience with the search engine. Accordingly, the one or more embodiments provide a means for performing search engine optimization by providing a means to automatically create a hierarchical graph which may be used by a search engine to substitute terms provided in a search query for other terms which are calculated to better reflect the user's intent—or at least to provide the user with alternative paths of search inquiry.

FIG. 4 and FIG. 5 show specific examples of the construction of a general graph (FIG. 4) and a hierarchical graph (FIG. 5) from the search terms in FIG. 3. In one or more embodiments, the general graph shown in FIG. 4 is an example of the general graph (120) shown in FIG. 1. Further, in one or more embodiments, the hierarchical graph shown in FIG. 5 is an example of the hierarchical graph (130) shown in FIG. 1.

Initially, prior to constructing the general graph in FIG. 4, data pre-processing is performed on the data shown in FIG. 3 in accordance with one or more embodiments. For example, the terms in the search queries are parsed and identified, with stop words deleted. In this case, the non-stop word terms are "dog" and "animal" in Query A (300); the non-stop word terms are "animal" and "alive" in Query B (302); the non-stop word terms are "computer" and "alive" in Query C (304); and the non-stop word terms are "kind", "animal", and "dachshund" in Query D (306). The terms "is," "a," "an," "are," and "what" are stop words which are so common that they detract from finding relevant documents, so these words are deleted.

Data de-duplication is then performed. In particular, the terms "alive" appears twice and thus is redundant and should not appear twice in the general graph of FIG. 4. The facts that "alive" was associated with the terms "animal" and "computer" in the search terms is preserved by creating new pairwise relations (which become edge relations in the general graph) between the term "alive" and the terms "animal" and "computer." In any case, in this example, the term "alive" is duplicative among the search terms, so only one instance of "alive" is retained. Similarly, the terms "animal" and "animals" are considered sufficiently semantically similar that data de-duplication is applied to that term, resulting in only the term "animal" remaining in the general graph.

After data pre-processing is completed, these queries, and their terms, are then related to each other in pairwise relations in accordance with one or more embodiments of the invention. For example, Query D (306) is more specific than Query A (300). As a result, and as can be verified from analyzing the click data, that any resulting document that is clicked to due Query D (306) is also reached by Query A (300), but not vice-versa. Therefore, it may be assumed with relatively high probability (compared to other pairwise relations among other query pairs) that Query A (300) is broader than Query D (306) (i.e., (A>D)) and also that a relatively low probability exists that D>A. Hence, a node should be placed in a general graph that represents "animal" with a child node of "dachshund." Similarly, a node "alive" is associated with a child node "animal." The edges between these nodes may be "child" and "type", respectively, perhaps with different labels to convey different ontological or semantic relationships.

For a simpler example, let queries A and B be the queries: "change password" and "change admin password", respectively. In this case, B is more specific than A, because $P(A>B)=E_{\{d\sim Q\_B\}}[P(d \in I\_A)]$ for these two queries. As a result, and from the click data, any document that is clicked due to B is also reached by A, but not vice-versa. Therefore, it can be said that, with high probability, A>B, and with low probability B>A. Hence, there should be a node that represents ["change", "password"], with a child node "admin".

Returning now to FIG. 4, in accordance with one or more embodiments, a general graph is built automatically from the search queries shown in FIG. 3. As defined above, "node" is a term or a location within a graph. The general graph shown in FIG. 4 includes five nodes: Node A (400), Node B (402), Node C (404), Node D (406) and Node E (408). Node A (400) corresponds to the search term "Alive". Node B (402) corresponds to the search term "Animal". Node C (404) corresponds to the search term "Computer". Node D (406) corresponds to the search term "Dog". Node E (408) corresponds to the search term "Dachshund."

In one or more embodiments, the general graph shown in FIG. 4 also includes five edges. As defined above, an "edge" is a quantitative or qualitative relationship between two nodes. In this case, Edge (410) exists as a "type of" relationship between Node A (400) and Node B (402). Edge (412) exists as a quantitatively associated closeness score of 0.5 between Node A (400) and Node C (404). Edge (414) exists as a "type of" relationship between Node B (402) and Node D (406). Edge (416) exists as another "type of" relationship between Node B (402) and Node E (408). In addition, returned documents in Returned Results D (314) indicate that a "Dachshund" is a "type of" "dog." Thus, Edge (418) exists as another "type of" relationship between Node D (406) and Node E (408).

The graph shown in FIG. 4 is complete at this point and forms a general graph. However, the general graph shown in FIG. 4 could be improved, and thereby improve the quality of search engine optimization using a taxonomy graph like the general graph shown in FIG. 4.

Therefore, attention is now turned to FIG. 5, which, again, is an example of a type of hierarchical graph in accordance with one or more embodiments of the invention. Because the hierarchical graph shown in FIG. 5 is built from the general graph shown in FIG. 4, the two figures use common reference numerals that refer to common objects having common definitions.

Specifically, one edge, Edge (416), has been removed from the general graph shown in FIG. 4 to form the hierarchical graph shown in FIG. 5 in accordance with one or more embodiments of the invention. The Edge (416) has been removed because the underlying data indicates, ontologically, that a "dachshund" is a type of "dog". While a "dachshund" is also a type of "animal", the hierarchical tree shown in FIG. 5 is more efficient, because "dog" has an intermediate ontological meaning between "animal" and "dachshund". Additionally, by removing the Edge 416, Node B (402) becomes a root node, which more accurately reflects the ontological meaning between the terms initially placed in the general graph.

The one or more embodiments are able to infer from the data that a dachshund is ontologically a type of dog, because of the pairwise calculation (performed on the underlying queries that compose the underlying data set) have a probability that exceeds a threshold, as explained above. Likewise, by greedy pruning, the one or more embodiments are able to distinguish that "dog" has an intermediate ontological meaning between "animal" and "dachshund." Together, these procedures allow the construction of the hierarchical graph shown in FIG. 5.

The example shown in FIG. 4 and FIG. 5 are relatively simple. In a practical application, the amount of data shown in FIG. 3 would increase to millions or perhaps even billions of searches with a corresponding number of terms. The resulting general graph will be highly complex, from the perspective of a human programmer, and in all likelihood would be too complex to manually review or update on meaningful time scales. Thus, the automatic procedures described with respect to FIG. 2A and FIG. 2B used to construct the general graph of FIG. 4 and subsequent hierarchical graph of FIG. 5 provide significant advantages, especially with respect to creating hierarchical graphs for use in search engine optimization. However, the methods for building the hierarchical graph outlined in FIG. 2A and FIG. B could not be performed automatically on a computer without the techniques described therein.

In addition, the one or more embodiments described herein have other technical benefits. For example, the operation of the computer with respect to search engine optimization is improved because the one or more embodiments result in the computer returning more relevant search results, as described with respect to the contrast between FIG. 6 and FIG. 7. In another example, the one or more embodiments may serve as computerized infrastructure that empowers other computerized services. Thus, the one or more embodiments may be used to help query expansion for some other service. The one or more embodiments may also be used to perform computerized auto-completion, or to perform computerized auto-completion suggestions, such as when a user is using a graphical user interface to fill out a form or to compose text.

Figure 6:
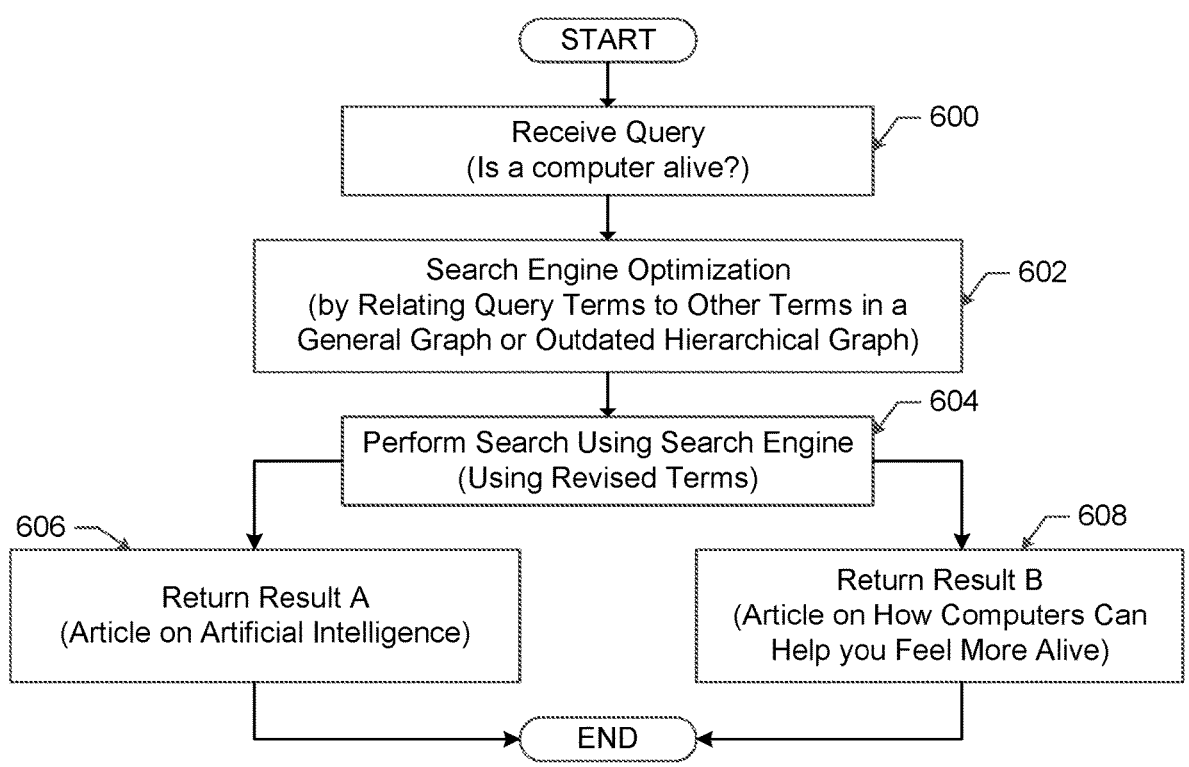
FIG. 6 and FIG. 7 depict use case examples of performing a search, in accordance with one or more embodiments.
Figure 7:
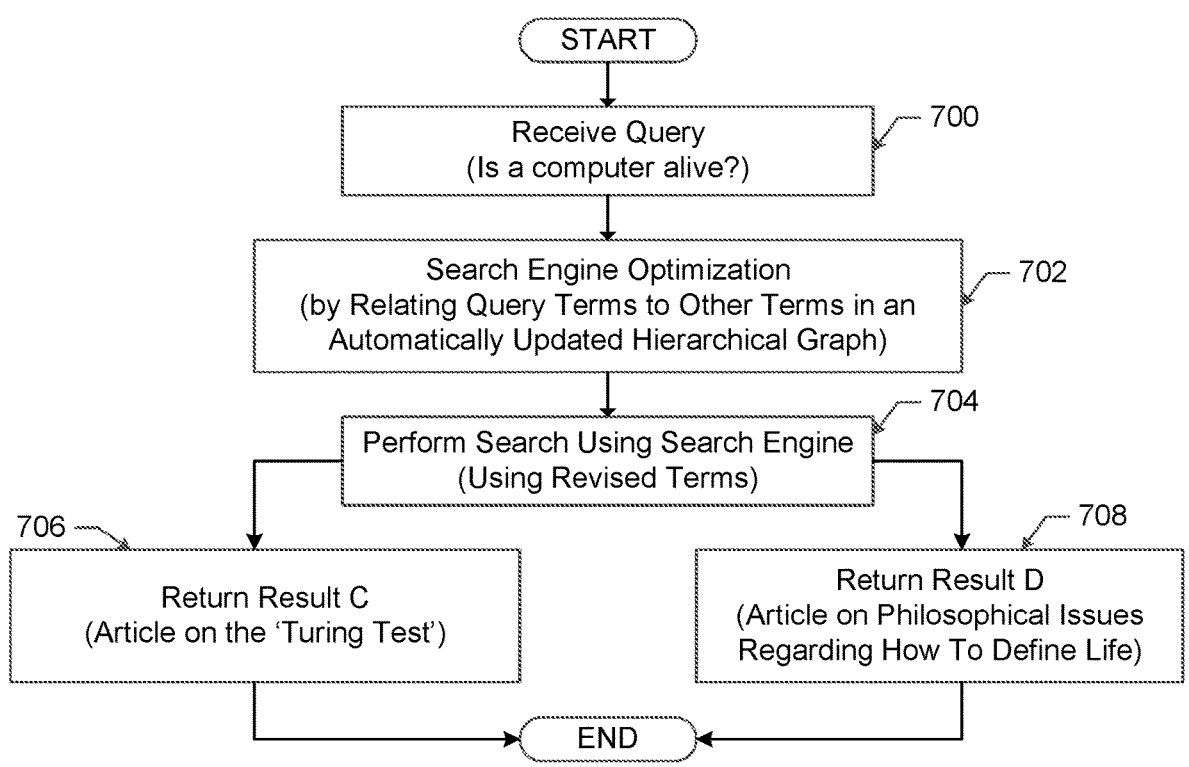

Attention is now turned to FIG. 6 and FIG. 7, which demonstrate the usefulness of the techniques described herein for automatically constructing a hierarchal graph in accordance with one or more embodiments. In particular, FIG. 6 and FIG. 7 considered together provide an example of search engine optimization (SEO).

FIG. 6 shows an example of use of a search engine, prior to SEO. In this example, the user is not a subject matter expert in cognitive science, but the user desires to find out information on whether a computer could be considered a living thing.

Thus, at step 600, the server receives a query. The query in this example is the natural language question, "is a computer alive." At step 602, the server then performs SEO. However, the server performs SEO by relating query terms to other terms in a general graph, or perhaps a hierarchical graph that is out of date. In this particular example, the term "computer" and the term "alive" are relatively far apart in the general graph, and further have incorrect or obsolete edges. Thus, the SEO program relates the word "computer" to "artificial intelligence" and the term "alive" to "feeling" and the term "computer" to "alive". The search engine ignores the stop words "is" and "a" and retains the original terms "computer" and "alive," but also adds the terms "artificial intelligence" and "feeling" to the query. These revised terms are now provided to the search engine.

Then, at step 604, the search is performed using the search engine, using the revised terms in accordance with embodiments. The search engine returns many results, including return result A at step 606 and return result B at step 608.

Return result A includes an article on artificial intelligence, and in this case describes how artificial intelligence can find patterns in data in a manner similar to a living human. However, return result A is not satisfying to the user, because the question of whether a computer is alive has not been answered.

Likewise, return result B is not satisfying for the user. Return result B is an article on how a computer can improve ones' life, i.e., "how computers can help you feel more alive." This result has to do with using computers to improve one's outlook on life but does not answer the user's question. Thus, the process terminates with the user frustrated and not knowing what terms could be used to improve the quality of returned results.

Attention is now turned to FIG. 7, which is similar to the procedure shown in FIG. 6, but now the hierarchical graph used during SEO has been constructed, in one or more embodiments, according to the procedures described with respect to FIG. 1 through FIG. 2B. At step 700, again the same query is received at the server, i.e., "is a computer alive." Again, at step 702, the server performs SEO by relating query terms to other terms in a hierarchical graph, automatically updated according to the procedures described herein.

This time, in one or more embodiments, the hierarchical graph is superior because the edges between nodes have been automatically pruned, adjusted, and added in order to better relate the ontological meanings (i.e., the edges) of the terms (i.e., nodes). Because the hierarchical graph has been improved, the SEO software relates the term "computer" to "life" and the word "alive" to "living", and even finds an edge between "alive" and "philosophy."

Again, the search is performed by inputting the revised terms into the search engine in accordance with embodiments of the invention. However, now at step 706 return result C is provided and at step 708 return result D is provided. Each return result includes articles that are more germane to the user's original intent. For example, the return result C is an article describing the Turing test, which is a test of a machine's ability to exhibit intelligent behavior equivalent to, or indistinguishable from, that of a human. Return result C is closer to the user's desired information. However, return result D includes an article on philosophical issues regarding how to define life. This article is close to the user's original search intent. Furthermore, because the search engine required articles to include the word "computer" this particular article also describes philosophical questions on whether a computer can be considered a living thing. Thus, the user receives a satisfactory result returned from the search engine, even though the initial query is relatively vague and undefined.

Thus, in summary, the one or more embodiments provide for several improvements over prior search engine optimization (SEO) techniques. First, the one or more embodiments grant a computer the ability to construct automatic generation of hierarchical graphs. Thus, a human technician does not have to construct or modify these hierarchical graphs. Second, the one or more embodiments improve the quality of SEO over known techniques by finding additional and more relevant edge connections between nodes, thereby leading to better, more relevant search engine results when SEO is performed. Current SEO techniques are not capable of automatically creating hierarchical trees, or generating the same degree of relevant results.

Figure 8A:
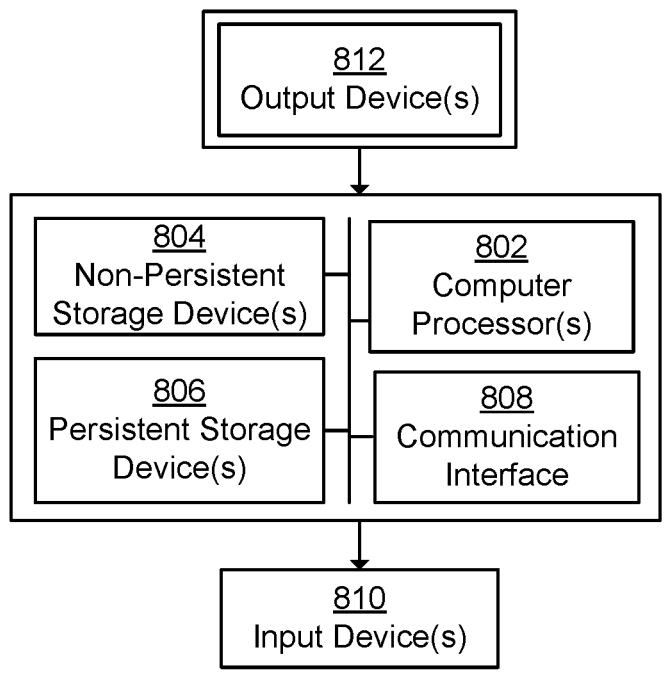
FIG. 8A and FIG. 8B depict a computer system and network in accordance with one or more embodiments

Embodiments of the invention may be implemented on a computing system. Any combination of mobile, desktop, server, router, switch, embedded device, or other types of hardware may be used. For example, as shown in FIG. 8A, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 8B:
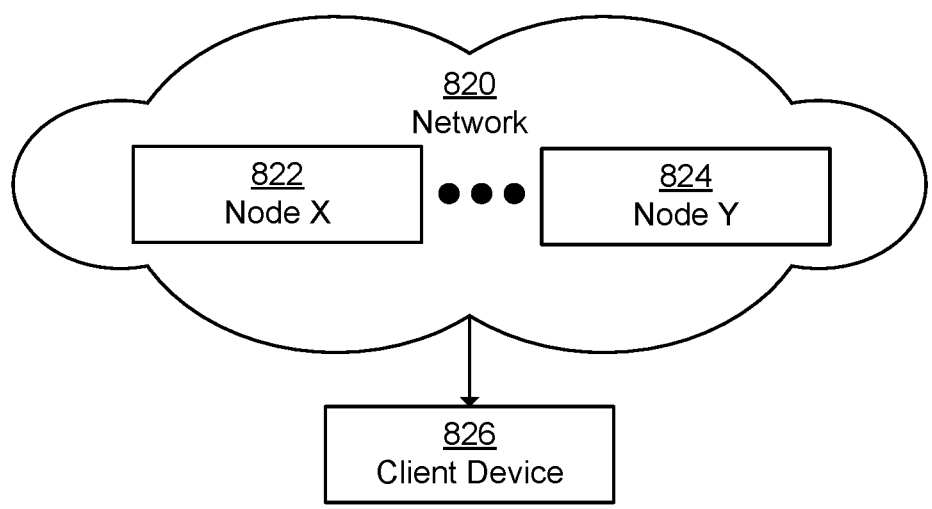

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (800) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8A. Further, the client device (826) may include and/or perform all or a portion of one or more embodiments of the invention.

The computing system or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 8A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 8A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 8A and the nodes and/or client device in FIG. 8B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    receiving a plurality of search queries submitted to at least one computerized search engine, the plurality of search queries comprising a plurality of terms;
    calculating, for each query in the plurality of search queries, a corresponding pairwise relation in the plurality of search queries,
    wherein the corresponding pairwise relation comprises a corresponding probability of a potential edge relationship between at least two terms of the plurality of terms, to form a plurality of potential edges;
    constructing a general graph from the plurality of terms in the plurality of search queries by selecting a plurality of edges from the plurality of potential edges,
    wherein the general graph comprises a plurality of nodes representing the plurality of terms used in the plurality of search queries, and
    wherein the general graph further comprises a plurality of edges representing semantic relationships among the plurality of nodes; and
    constructing a hierarchical graph from the general graph by altering at least one of the plurality of edges among the plurality of nodes in the general graph to form the hierarchical graph.

2. The method of claim 1, further comprising:
    performing search engine optimization by using the hierarchical graph.

3. The method of claim 2, wherein using the hierarchical graph comprises:
   receiving a new search query;
   comparing a term in the new search query to the hierarchical graph;
   finding a related term in the hierarchical graph that is ontologically related to the term;
   and substituting the related term for the term when performing a search using the search engine.

4. The method of claim 3, wherein constructing the hierarchical graph further comprises:
   connecting a plurality of roots in the general graph to a global root node.

5. The method of claim 4, wherein constructing the hierarchical graph further comprises:
   pruning lowest weighted edges from the plurality of edges in the general graph.

6. The method of claim 1, wherein constructing the general graph and constructing the hierarchical graph are both performed without user-defined labels for a target domain.

7. The method of claim 1, further comprising:
   discarding, prior to constructing the general graph, potential edges in the plurality of potential edges that fail to meet a threshold probability value.

8. The method of claim 1, further comprising:
   pre-processing, prior to calculating the corresponding probability, the plurality of search queries.

9. The method of claim 8 wherein pre-processing comprises:
   performing data normalization by applying at least one of lemmatization, special character removal, and stop word removal to the plurality of search queries.

10. The method of claim 8 wherein pre-processing comprises:
    performing data de-duplication on the plurality of search queries.

11. The method of claim 10 wherein the plurality of search queries also comprises:
    sets of documents retrieved by a search engine as a result of executing the plurality of search queries, and subsets of documents from the sets of documents that a user clicks after receiving the result.

12. The method of claim 11 wherein performing data de-duplication comprises:
    defining a collaborative similarity between pairs of the plurality of search queries as a similarity of associated clicked documents in the subsets of documents;
    identifying semantically identical queries based on a combination, of collaborative similarity and lexical similarity between the pairs of the plurality of search queries, exceeding a predetermined threshold value; and
    removing, from the plurality of search queries, the semantically identical queries.

13. The method of claim 12 wherein the plurality of search queries further comprises at least one of timestamps, user identifiers, session identifiers, dwell times, and complete payloads returned by the search engine.

14. A system comprising:
    a data repository storing:
      a plurality of search queries comprising a plurality of terms, pairwise relations comprising probabilities of potential edge relationships between at least two terms of the plurality of terms;
      a plurality of potential edges derived from the pairwise relations;
      a general graph of the plurality of terms in the plurality of search queries,
        wherein the general graph comprises a plurality of nodes representing the plurality of terms used in the plurality of search queries, and
        wherein the general graph further comprises a plurality of edges representing semantic relationships among the plurality of nodes; and
      a hierarchical graph comprising one of a directed acyclic graph and a tree graph;
    a processor in communication with the data repository;
    an edge generator, when executed by the processor, configured to calculate the pairwise relations and to establish the potential edge relationships between the plurality of terms from the plurality of search queries; and
    a graph generator, when executed by the processor, configured to:
      construct the general graph of the plurality of terms from the potential edge relationships; and
      construct the hierarchical graph by altering at least one of the plurality of edges among the plurality of nodes in the general graph to form the hierarchical graph.

15. The system of claim 14, further comprising:
    a search engine executable by the processor and configured to:
      receive the plurality of search queries, wherein the data repository further stores the plurality of search queries.

16. The system of claim 15, wherein the search engine is further configured to:
    receive a new search query;
    compare a term in the new search query to the hierarchical graph;
    find a related term in the hierarchical graph that is ontologically related to the term; and
    substitute the relate term for the term when performing a search using the search engine.

17. The system of claim 14 further comprising:
    a pre-processing engine configured to performing data de-duplication on the plurality of search queries.

18. The system of claim 17 wherein the data pre-processing engine is further configured to:
    define a collaborative similarity between pairs of the plurality of search queries as a similarity of associated clicked documents in the subsets of documents;
    identify semantically identical queries based on a combination, of collaborative similarity and lexical similarity between the pairs of the plurality of search queries, exceeding a predetermined threshold value; and
    remove, from the plurality of search queries, the semantically identical queries.

19. The system of claim 18 wherein the plurality of search queries comprises at least one of timestamps, user identifiers, session identifiers, dwell times, complete payloads returned by the search engine.

20. A method comprising:
    receiving a plurality of search queries submitted to at least one computerized search engine, the plurality of search queries comprising a plurality of terms;
    pre-processing the plurality of search queries by:
      performing data normalization by applying at least one of lemmatization, special character removal, and stop word removal to the plurality of search queries; and performing data de-duplication on the plurality of search queries;

calculating, for each query in the plurality of search queries, a corresponding pairwise relation in the plurality of search queries,
 wherein the corresponding pairwise relation comprises a corresponding probability of a potential edge relationship between at least two terms of the plurality of terms, to form a plurality of potential edges;

discarding potential edges in the plurality of potential edges that fail to meet a threshold probability value;

constructing a general graph of the plurality of terms in the plurality of search queries by selecting a plurality of edges from the plurality of potential edges,
 wherein the general graph comprises a plurality of nodes representing the plurality of terms used in the plurality of search queries, and
 wherein the general graph further comprises a plurality of edges representing semantic relationships among the plurality of nodes; and constructing a hierarchical graph from the general graph by:
 altering at least one of the plurality of edges among the plurality of nodes in the general graph to form the hierarchical graph;
 connecting a plurality of roots in the general graph to a global root node; and
 pruning lowest weighted edges from the plurality of edges in the general graph; and performing search engine optimization using the hierarchical graph.

* * * * *